Aug. 23, 1960　　R. A. BRODING ET AL　　2,949,973
METHODS OF AND MEANS FOR MEASURING TRAVEL
TIMES THROUGH EARTH FORMATIONS
Filed July 27, 1953　　　　　　　　　　　2 Sheets-Sheet 1
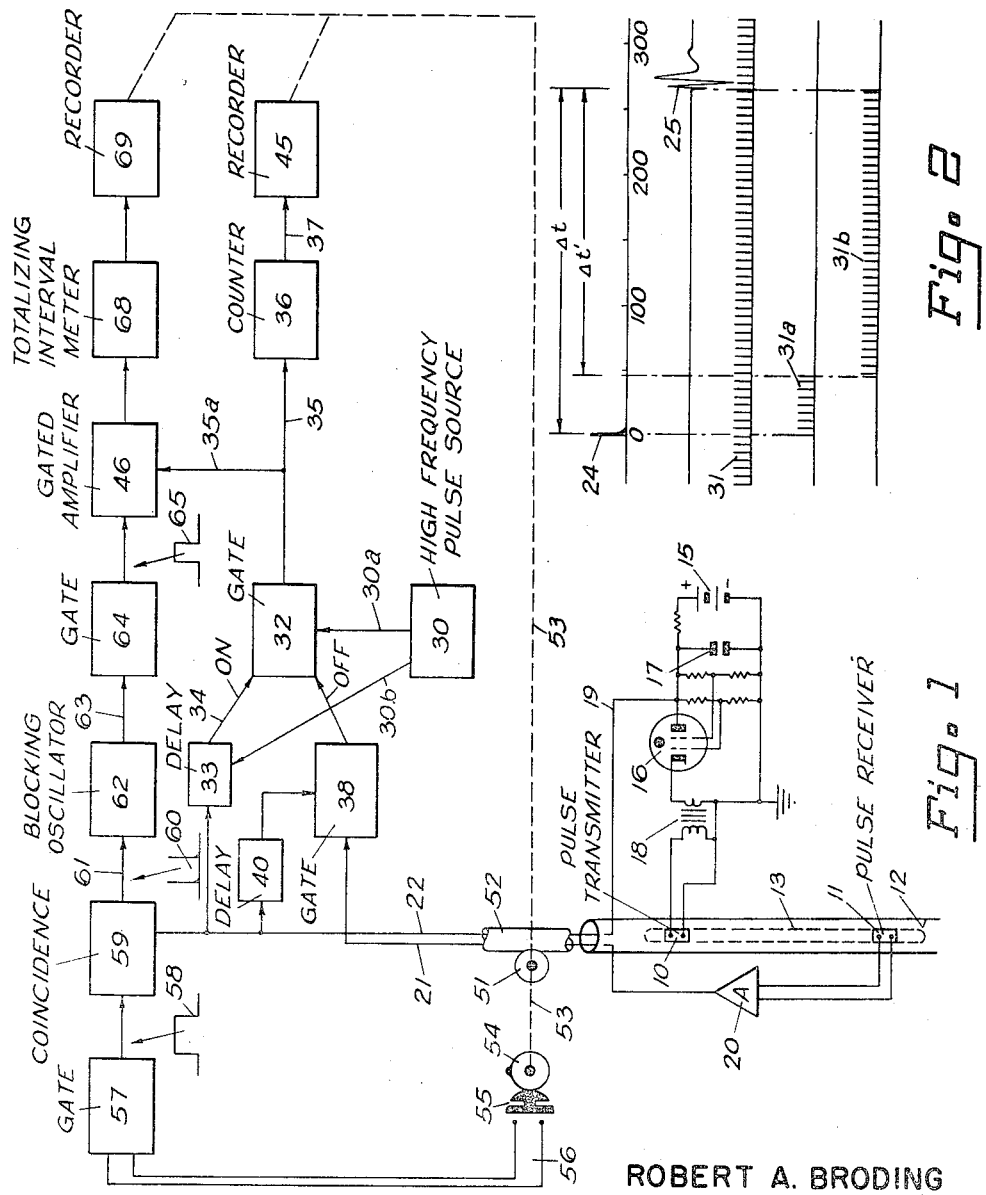
ROBERT A. BRODING
GERALD C. SUMMERS
JOHN O. ELY
*INVENTORS*
BY D. Carl Richards
*ATTORNEY*

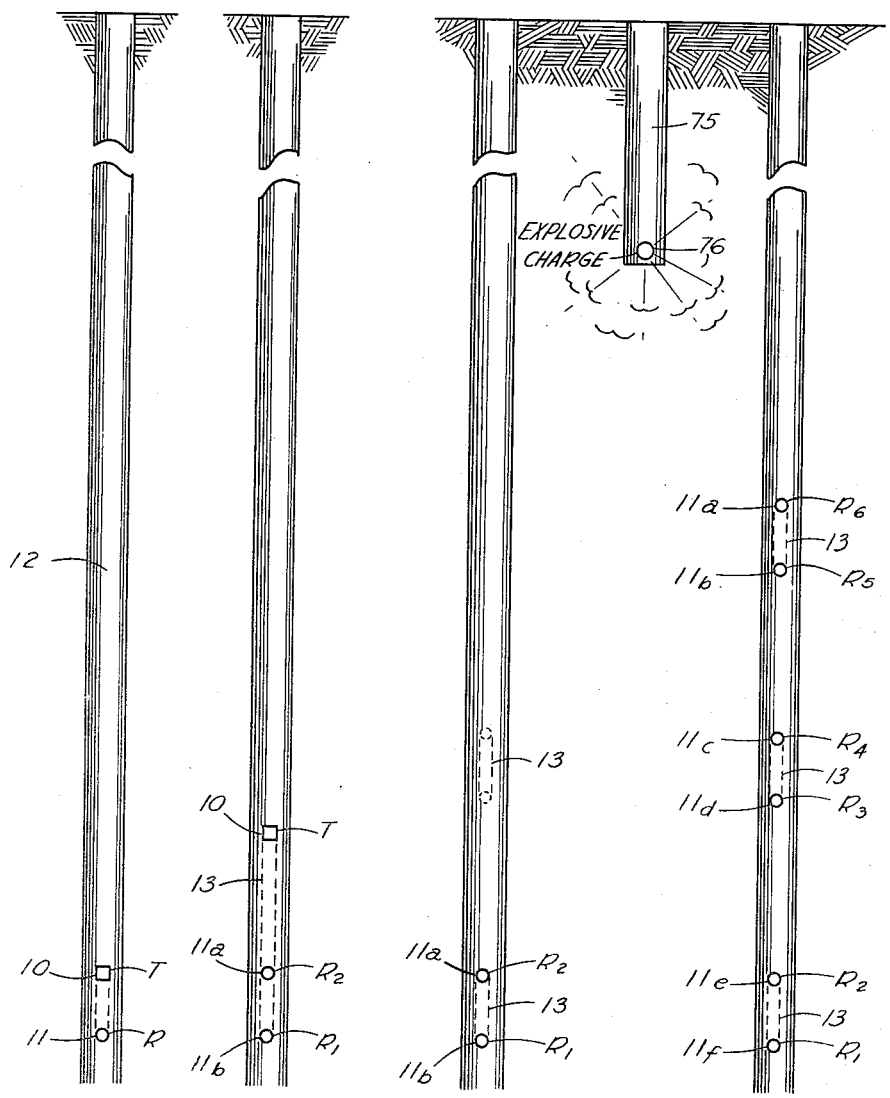

United States Patent Office 2,949,973
Patented Aug. 23, 1960

2,949,973

METHODS OF AND MEANS FOR MEASURING TRAVEL TIMES THROUGH EARTH FORMATIONS

Robert A. Broding, Tulsa, Okla., and John O. Ely and Gerald C. Summers, Dallas, Tex., assignors, by mesne assignments, to Socony Mobil Oil Company, Inc., a corporation of New York Filed July 27, 1953, Ser. No. 370,376

11 Claims. (Cl. 181—.5)

This invention relates to methods of and apparatus for measuring travel times of pulses through earth formations penetrated by a borehole and has for an object the attainment of highly accurate measurement of such travel times at a plurality of different depths in the borehole.

Useful data is provided as to the nature of formations by a measurement of the velocity of acoustic energy through short lengths of earth formations penetrated by a borehole. A continuous measurement may be made along the borehole for production of a travel time or a velocity log which clearly identifies zones in the formations characterized by velocity contrasts such as form seismic reflection horizons. Such measurements therefore serve not only as a useful index to formation character from a logging viewpoint but additionally are useful as a correlation tool in seismic exploration.

In carrying out the present invention in one form thereof the travel times are determined by generating a timing function varying with time in a known manner. By initiating and terminating the recording of the timing function in timed relation with the appearance of the pulses between predetermined locations or points along the borehole, the length of the recorded timing function will represent the time interval during which the pulse will travel from one location or station to the other through the formation. Knowing the distance between the two locations, the velocity of the pulse through the formation is readily determined. By reason of the use of the timing function in the described manner, the recorded segments thereof, each corresponding with different vertical lengths of the formation, provide a measurement of travel time between selected upper and lower levels within the borehole.

A further advantage of the invention is the availability on the market of the several components by means of which the methods are performed and the system as a whole operated to achieve the foregoing results.

In a preferred form of the present invention the acoustic velocity of the formations is measured by energizing a high frequency pulse counting system coincident with the transmission of an acoustic pulse in the borehole and de-energizing the pulse counting system upon reception of the acoustic pulse at the second point in the borehole. Further, in accordance with the present invention, the total acoustic travel time for a given earth section is determined by energizing and de-energizing the high frequency pulse generating system and its associated counting system once for each of a plurality of selected fractional portions of the distance between the point of generation and the point of reception of the acoustic waves as such points are moved along the borehole. By accumulating the number of pulses produced by the high frequency pulse producing means, the total travel time which is proportional to the total number of pulses multiplied by the fraction may be obtained.

For a more detailed understanding of the present invention and for further objects and advantages thereof, reference may now be had to the following description taken in conjunction with the accompanying drawings in which:

Fig. 1 illustrates the pulse counting system in partial block diagram form;

Fig. 2 is a graphical representation of the system operation, and

Figs. 3–5 illustrate further field applications of the invention.

In accordance with a preferred form of the present invention, two related but distinct parameters are measured. A first measurement is made to produce a first output function representative of an incremental travel time $\Delta t'$. The measured parameter is the time required for an acoustic pulse to travel over the section of the formations vertically separating an acoustic transmitter and receiver in a borehole. The second parameter or output function produced is the total time required for travel of an acoustic pulse through the vertical earth section separating two levels in the formations penetrated by a borehole. The latter section, in general, has much greater length than the separation between the logging transducers. Measurement of both parameters utilizes a first electrical pulse appearing at the earth's surface in coincidence with the generation of an acoustic pulse in the borehole and a second electrical pulse appearing at the earth's surface coincident with the reception of the acoustic pulse in the borehole a predetermined distance from the point of its generation.

Referring to Fig. 1 there is illustrated a well-logging system which includes a pulse transmitter 10 and a pulse receiver 11 supported in a predetermined spaced apart relation for movement along the length of a borehole 12 by suitable structure forming a unit indicated by the dotted outline 13. Details of a preferred type of supporting structure as well as preferred forms of transducers 10 and 11 are set forth in co-pending application of John O. Ely, Serial No. 346,593, for Mechanically Coupled Acoustic Well Logging System, now U.S. Patent 2,757,358, issued July 31, 1956.

One transducer comprises a pulse transmitter 10 energized from a suitable energy source 15 as through an electronic pulser network which may be of the type illustrated, comprising a free running relaxation oscillator circuit. The oscillator circuit includes a gas tube or thyratron 16 and a condenser 17 charged from source 15. Condenser 17 periodically discharges through thyratron 16 to excite the primary winding of a transformer 18. The secondary winding of transformer 18 is connected to the transducer 10 to apply repeated current pulses at a pulse repetition rate determined by the time constants of circuits connected to the control and screen grids of the tube 16 and by the condenser 17. Preferably the pulses are sharp and repeated at a rate in the range of approximately twenty cycles per second although the repetition rate is not critical and need not be maintained fixed.

Although the oscillator circuit has been illustrated in its electrically operative relation to transducer 10, it is to be understood that the elements will either be housed within and carried by unit 13 or located at the earth's surface and suitably coupled through cable means to the transducer 10.

An electrical pulse 24, Fig. 2, generated in time coincidence with the excitation of transducer 10 is applied by way of conductor 19 and cable channel 22 for transmission to the earth's surface. The transducer 10 at one point or station-location produces sharp, spaced, acoustic pulses which travel through the formations adjacent to the receiving transducer at another point or station-location. An electrical pulse 25, Fig. 2, is generated by receiver 11 in response to each received acoustic pulse.

The electrical pulse 25 is applied to an amplifier 20 and thence through cable channel 21 for transmission to the earth's surface. Thus a pair of electrical pulses 24 and 25, separated in time, repeatedly appear at the earth's surface for utilization in a time interval measuring system.

*Measurement of incremental travel time $\Delta t'$*

For the purpose of the following description the travel time $\Delta t$ may be taken to mean the time interval between the electrical pulse 24 appearing at conductor 19, and the beginning of electrical pulse 25 appearing at the output of amplifier 20. A corrected "incremental travel time," $\Delta t'$, will refer to a period shorter than $\Delta t$ by an amount equal to (1) the time required following discharge of condenser 17 actually to produce an acoustic pulse and to transmit it to the borehole wall, plus (2) the time required to transmit a pulse from the borehole wall through a short path intermediate the borehole wall and the receiving transducer 11. In other words, the interval $\Delta t'$ is defined as the time of travel of a pulse through a vertical length of formation equal to the vertical spacing between transducers 10 and 11.

The manner in which the interval $\Delta t'$ is measured by a pulse counting system controlled by pulses 24 and 25 will now be described.

A timing function source shown as a high frequency pulse source 30 continuously applies sharp pulses 31, Fig. 2, to an electronic gate 32 and to a delay network 33 by way of channels 30a and 30b, respectively. The pulses 31 from source 30 preferably are in the megacycle range.

Each pulse 24, Fig. 2, produced in response to repeated discharges of condenser 17, is applied by way of channel 22 to the delay network 33 and initiates pulse counting as to be responsive to pulses forming the signal 31 on channel 30b. After a predetermined count period, an output pulse is transmitted from network 33 to gate 32 to turn gate 32 On and pass pulses from source 30 to channel 35. The delay period of network 33 is made equal to the portion of the time interval attributable to travel of the acoustic pulses in the portions of their path other than the formation vertically disposed between and adjacent transmitter 10 and receiver 11.

Pulses from source 30 passing through gate 32 are applied through channel 35 to a pulse counter 36. Counter 36 preferably is of the type that produces a D.C. voltage proportional in magnitude to the number of pulses applied thereto. Transmission of pulses to counter 36 is terminated upon the arrival of the first energy of pulse 25, fed through gate 38, at the Off channel of gate 32. Thus the length of time during which pulses from source 30 pass through gate 32 to counter 36 is equal to the interval $\Delta t'$.

As best illustrated in Fig. 2, the pulses 31 from source 30 are continuously available to gate 32 and delay network 33. Delay network 33 counts a segment 31a of pulses 31, the segment being of a predetermined and preset length. As illustrated, this segment is approximately 45 microseconds long. At the end of segment 31a a pulse is applied to channel 34 which opens gate 32. Gate 32 then passes segment 31b of the pulses 31 to counter 36. Segment 31b is utilized in counter 36 to produce in the output channel 37 a D.C. voltage proportional to the length of segment 31b. The segment 31a may be termed an instrument delay and represents that portion of time when the acoustic pulses are not traversing the formations along a vertical path. The segment 31b represents $\Delta t'$, the fraction of the interval $\Delta t$ occupied by acoustic pulses traveling vertically through the borehole formation. While variations in $\Delta t$ will portray variations in velocity of formations adjacent a borehole, a measurement or log of $\Delta t'$ more clearly indicates such variations and in addition may be utilized for measurements later to be described that are as important as a log of either $\Delta t$ or $\Delta t'$.

To assure accuracy in making the foregoing measurements, the gate 38 is squelched or closed by action of a delay network 40 over an interval beginning with pulse 24 and preferably longer than the segment 31a. In this manner gate 38 does not and cannot close gate 32 except in response to appearance of gate-closing pulse 25.

*Total travel time*

The second parameter measured, in accordance with the present invention, is the total time required for an acoustic pulse to travel over an earth section much longer than the spacing of the logging transducers 10 and 11. More particularly, with the series of operations shown in Fig. 2 periodically repeated, pulse segments 31b from gate 32 appearing on channel 35 are selectively applied to an integrating or totalizing system in a depth controlled manner, i.e. there is applied one pulse segment for each unit distance of movement of the exploring unit 13 along borehole 12. Stated otherwise, the number of pulses transmitted through the gated amplifier 46 multiplied by the period of such pulses divided by the number of segments 31b or samplings per foot of borehole length traversed by the exploring unit in accumulating the number of pulses or segments is proportional to the time required for a pulse to travel through a formation section of length equal to the distance within the borehole traversed by the exploring means.

A cable measuring system is provided to produce a third output function. The cable measuring system together with a control element initiates a pulse sampling action once for each unit of movement of the exploring unit in the borehole 12. While other types may be suitable, in the present form of the invention, a measuring sheave 51 is driven by the cable for transmission of motion by couplings 53 to recorder 45 and to a cam 54. Such motion is utilized in recorder 45 to provide a record depth scale while cam 54 actuates armature 55 to close the circuit 56 once for each unit travel of measuring sheave 51. Circuit 56 is the control circuit of gate 57.

For the purpose of the following description, it will be assumed that circuit 56 is closed once for each foot of travel of the exploring unit 13 in borehole 12. It will further be assumed that transmitted pulses 24 occur at a rate of approximately twenty per second thereby having a 0.05 second interval between adjacent pulses. With such a system, gate 57 applies an output gate pulse of the form 58 having a duration at least equal to and preferably greater than the period between the transmitted pulses 24. The gate pulse 58 is applied to a coincidence circuit 59 and readies it for energization. The first pulse 24 applied to coincidence circuit 59 by way of cable channel 22, following the application of gate pulse 58, produces at least one, and perhaps two, pulses 60 in the output channel 61. The first of these pulses 60 actuates blocking oscillator 62. Blocking oscillator 62 has a long recovery period, preferably greater than the period of the gate pulse 58 so that for each gate pulse 58, blocking oscillator 62 will produce but a single output pulse in channel 63. The latter output pulse is initiated by, and occurs in coincidence with, the first pulse 24 appearing within the period of the gate pulse 58. The pulse from blocking oscillator 62 is applied to gate 64 which applies a gating pulse 65 to the amplifier 46.

The pulse segment 31b is transmitted through amplifier 46 to a totalizing interval meter 68. The output of meter 68 is applied to a recorder 69. Totalizing interval meter 68 preferably is of the type that accumulates count of the interval-determining segments 31b passed by the gated amplifier 46. Thus for each successive closure of circuit 56, a segment 31b is fed into interval meter 68 which is added to the number of pulses previously accumulated.

At selected distances along the borehole, the total number of pulses accumulated by meter 68 may be printed onto a suitable chart or record strip to provide a detailed depth-travel time chart.

In operation, the exploring unit 13 may be positioned at a given level in the borehole, for example, at 5000 feet. While unit 13 is stationary, the borehole oscillator is energized and condenser 17 is discharged approximately twenty times per second. Segment 31b is repeatedly applied to counter 36 and a voltage is thus produced and applied to recorder 45. The length of segment 31b is directly proportional to the vertical separation between transducers 10 and 11 and inversely proportional to the velocity of the formations separating them. As the unit 13 is moved along the length of the borehole 12, the variations in the incremental travel time $\Delta t'$ appear on recorder 45 which provides a continuous plot of incremental travel time as a function of depth.

As exploring unit 13 is moved along the borehole 12, cam 54 actuates armature 55 once each foot thereby to initiate a sequence of operations which includes energizing gate 57 and coincidence circuit 59, and consequently by action of pulse 24, actuating the blocking oscillator 62 and gate 64. Thus with each one foot of change of level of unit 13 in borehole 12, amplifier 46 passes one pulse segment 31b to the totalizing meter 68.

The effect of the electrical signal produced by the closing of the circuit 56 upon the gate 57 has the described effect inasmuch as the amplifier 46 is normally closed and is opened upon appearance in the output of gate 64 of the control signal or pulse 65. Thus, opening or making the amplifier 46 effective in timed relation with movement of unit 13 along the borehole assures the recording of but one segment 31b of the timing function 31 for each change of level of unit 13. There is thus avoided continuous recording of the timing function with change of level of device 13: instead, there are recorded successive segments 31b corresponding with successive incremental lengths of the borehole identified by simultaneous movement of the locations of the transducers 10 and 11 along the borehole.

In one form of the invention, the transducers 10 and 11 may be spaced six feet apart. With such a spacing, the interval $\Delta t'$ will fall in the range of from 250 microseconds to 1500 microseconds corresponding respectively to the time intervals required for an acoustic pulse to travel from a first location to a second location spaced six feet from the first and in the highest and lowest velocity formations likely to be encountered. Accordingly, the length of the pulse 65 and the length of time the amplifier 46 will "be opened" for passage of signals to the totalizing meter 68 will be somewhat longer than 1500 microseconds to assure completion of the longest segment 31b likely to be encountered in borehole exploration.

The meter 68 counts the number of pulses in each segment 31b consecutively from zero, the count increasing each time cam 54 closes circuit 56 by an amount proportional to the length of each of the successive segments 31b. When the borehole unit 13 is moving from a 5000 foot depth to a depth of 4000 feet, the number of pulses recorded on recorder 69 divided by the separation (in feet) between transducers 10 and 11 is a direct measure of the time of travel of a pulse between the 4000 and 5000 foot levels. This time is the ratio of number of pulses on recorder 69 to the separation of the transducers multiplied by the period of the high frequency pulse source 30.

The system illustrated in Fig. 1 is based upon a free running borehole oscillator-pulser with the surface measuring and sensing system operating independently. The surface system is controlled by the depth measuring system. It will be apparent that cam 54 or its equivalent could be utilized to trigger the pulse transmitter 10 once each foot or other selected interval. In the latter case the gate 57, coincidence circuit 59 and blocking oscillator 62 could be eliminated. However, the former system is preferred inasmuch as a higher sampling rate is provided for the measurement of incremental travel time $\Delta t'$ by counter 36.

The instrument delay represented by segment 31a has been found to be from 45 to 75 microseconds, depending upon the particular design of transducer and supporting unit used. The delay may be determined by the following procedure. Instrument delay may readily be determined by placing the instrument in a test chamber made of known velocity material. Thus the travel time for a given separation between transducers is known and the instrument delay is thus the difference between a measured value and the known value of time required for a pulse to traverse the material intermediate the pair of transducers.

For ease in understanding the invention, various components of a counting system have been illustrated in a block diagram from which the operations may be readily ascertained. The components themselves may take various forms, as well understood by those skilled in the art. The high frequency pulse source 30, the gate 32 and counter 36 are currently available on the market and variously labelled, as packaged timing units or interval timers. Recorder 45 preferably is of the strip chart type to provide a line chart of the interval $\Delta t'$ as a function of depth. Recorder 69 preferably is of the printing type to present the total accumulated travel time increasing as a function of travel of the unit 13 along the borehole 12. A suitable totalizing meter and recorder are currently marketed by the Berkeley Scientific Corp., Richmond, California, as a Berkeley "Digital Recorder," Series 1550.

Referring now to Fig. 3, the system thus far described in connection with Figs. 1 and 2 has again been illustrated to show the transmitting transducer 10 in its relation to the receiving transducer 11 within a borehole 12, the other details of the apparatus of Figs. 1 and 2 having been omitted in Fig. 3.

The methods and apparatus described in connection with Figs. 1–3 may be applied to an arrangement such as illustrated in Fig. 4 where the transmitting transducer 10 is located above a pair of receiving transducers 11a and 11b spaced apart a predetermined distance, such as the distance between transmitter 10 and receiver 11 of Fig. 3. In accordance with Fig. 4 the arrival of a pulse generated by transducer 10 at receiver 11a produces a pulse similar to pulse 25 at the time of and functioning as the pulse 24 of Fig. 2, and the arrival of the pulse generated by transducer 10 at receiver 11b produces the pulse 25 of Fig. 2. Thus, in accordance with Fig. 4 the initiation and termination of the recording of the segment 31b are under the control of receiving transducers 11a and 11b. As in the case of Figs. 1 and 3, the three transducers 10, 11a and 11b preferably form a unit 13 movable along the length of the borehole, the particular location at any particular time being reflected by the measuring sheave 51. The measurement in other respects will be similar to that described in connection with Fig. 1.

While the transmitter 10 has heretofore been described broadly, where the pulse is of an acoustic nature, which it generally will be, only two receiving transducers 11a and 11b need be utilized as shown in Fig. 5 where the acoustic pulse is generated within a shot hole 75 as by the detonation of an explosive charge 76. The arrival of the acoustic pulse at the receiving transducer 11a again generates a pulse such as pulse 24, Fig. 2, while the arrival of that pulse at the transducer 11b gives rise to the pulse 25, the operation otherwise being similar to that heretofore described in connection with Figs. 1–3, with the unit 13 movable along different lengths of the borehole, as desired.

Where the detonation of dynamite forms the source of the acoustic impulse, it may be desirable to multiply the number of receiving transducers. Thus, there may be located transducers 11a and 11b at an upper level, the receiving transducers 11c and 11d at an intermediate level, and transducers 11e and 11f at a lower level, it being understood that as many pairs of receiving transducers may be employed as appears desirable. Where the transducers are spaced discrete distances apart, but a single measuring and recording system need be utilized to record in succession the segments 31b of the timing function, the operation in other respects being the same as has already been described.

Though a preferred form of the invention has been disclosed, it is to be understood that modifications may now become apparent to those skilled in the art and it is intended to cover such modifications as fall within the scope of the appended claims.

What is claimed is:

1. The method of measuring the time of travel of pulses through a formation penetrated by a bore hole which comprises generating an acoustic pulse for travel through said formation, generating a timing function which varies in length with time in a known manner, selectively recording said function by initiating and terminating said recording of said timing function in timed relation respectively with the appearance of said pulse at two predetermined stations along said formation to indicate in terms of the recorded duration of said timing function the time interval during which said pulse travels through said formation from one said station to the other said station progressively changing the location of said stations to predetermined points between selected depths in said bore hole to produce discrete segments of said timing function representative of pulse travel time at each of said points, recording one of said segments for each of said points, and totalizing said recorded segments to produce a function which in magnitude is proportional to the time of travel of an acoustic pulse over the formation interval between said selected depths.

2. The method of measuring the time of travel of pulses through a formation penetrated by a bore hole which comprises generating an acoustic pulse for travel through said formation, generating a timing function which varies in length with time in a known manner, selectively recording said function by initiating said recording in timed relation with the appearance of said pulse at a predetermined point along said formation and terminating said recording in timed relation with the appearance of said pulse at a point spaced a predetermined distance from said first named point to indicate in terms of the recorded duration of said timing function the time interval during which said pulse travels through said formation between said points repeating the aforesaid steps between different portions of said formation at a plurality of locations spaced one from the other along said bore hole, and summing the recorded duration of said timing function at each of said locations.

3. The method of obtaining a travel time log of a section of earth penetrated by a bore hole which comprises producing a plurality of discrete segments of a function which for each segment varies with time at the same rate and in the same sense, in timed relation with the initiation of each said segment generating an acoustic pulse in said bore hole for travel through the bore hole formations, at each of a plurality of locations spaced one from the other along the bore hole detecting each acoustic pulse, terminating each said segment in response to a detected pulse, generating an output function which in magnitude is representative of the sum of said segments, and recording said output function on a depth scale of said plurality of locations.

4. The method of obtaining a travel time log of a section of earth penetrated by a bore hole which comprises generating a time function consisting of a plurality of pulses equally time-spaced one from the other, generating an acoustic pulse for travel through the bore hole formations, initiating and terminating the recording of said timing function in timed relation respectively with the appearance of said acoustic pulse at predetermined station-locations along said formations to indicate in terms of the recorded duration of said timing function the time interval during which said acoustic pulse travels through said formations from one said station-location to the other said station-location, simultaneously varying the positions of said station-locations along said bore hole, repeating the aforesaid steps at a plurality of said station-locations spaced one from the other along said bore hole, and totalizing the length of all said recorded timing functions produced during travel of said acoustic pulse between each of said plurality of station-locations.

5. A system for measuring the time of travel of acoustic pulses over a vertical earth section penetrated by a bore hole which comprises a pair of acoustic transducers spaced a predetermined distance apart, means for moving said transducers through said bore hole over the interval occupied by said earth section, means operable at a low repetition rate to produce a succession of acoustic pulses, a high frequency source for generating a timing function, a recorder, means coupled to said transducers for controlling said recorder to initiate and to terminate the recording of said timing function in timed relation with the appearance of said acoustical pulses at said transducers, means for actuating said control means in response to movement of said transducers along said bore hole at each of a plurality of uniformly spaced apart points for recording one segment of said timing function at each of said locations, the number of pulses recorded being proportional to the travel time of an acoustic pulse through said section.

6. A system for measuring the time of travel of acoustic pulses over a vertical earth section penetrated by a bore hole which comprises a pair of acoustic transducers spaced a predetermined distance apart, cable means for supporting and moving said transducers through said bore hole and along a selected length of said earth section, means operable at a low repetition rate to produce a succession of acoustic pulses, a high frequency source for generating a timing function, a recorder, means coupled to said transducers for controlling said recorder to initiate and to terminate the recording of said timing function in timed relation with the appearance of said acoustical pulses at first one and then at the other of said transducers, cable measuring means for actuating said control means in response to movement of said cable and said transducers along said bore hole to each of a plurality of uniformly spaced apart points for recording one segment of said timing function at each of said locations, the number of pulses in each said segment so recorded being proportional to the travel time of an acoustic pulse through a length of said section equal to said spacing of said transducers, and the total number of pulses recorded being proportional to the travel time of said acoustic pulse along said selected length.

7. In a well logging system: means for lowering into a borehole a logging device adapted to produce first electrical signals representative of a physical characteristic of the earth formations traversed by said borehole; electrical conducting means connected to said logging device for conducting said electrical signals to the surface of the earth; means connected to said lowering means adapted to intermittently activate an electric current thereby producing intermittent signals, each activation of said current representing a predetermined displacement of said logging device; circuit means for modifying a characteristic of said intermittent signals in accordance with changes in said first electrical signals representative of changes in said physical characteristic; a recorder; and electrical conducting means interconnecting said circuit means and said recorder, said electrical conducting means serving to conduct the modified signals to said recorder.

8. A well logging system comprising a logging device having means for producing first electrical signals representative of a physical characteristic of earth formations traversed by a borehole; means for lowering said logging device into said borehole; electrical conducting means connected to said logging device for conducting said electrical signals to the surface of the earth; means connected to said lowering means for producing second electrical signals in correlation with depth of said device in said borehole, said first and said second signals respectively being initiated in predetermined time-relation upon predetermined displacements of said logging device within said borehole, circuit means having connections for application thereto, and operable under the control, of said first electrical signals and of said second electrical signals for modification of a characteristic of said second signals by said first signals in accordance with said change in said physical characteristic of said earth formations, a recorder, and electrical conducting means interconnecting said circuit means and said recorder for operating said recorder in accordance with said modified second signals to record changes in said physical characteristic of said earth formations.

9. The well logging system of claim 8 in which said means for producing said second electrical signals is adapted to generate a plurality of trains of uniformly time-spaced pulses of uniform amplitude, and said circuit means in response to said first electrical signals modifies the length of said trains of pulses.

10. The well logging system of claim 8 in which said means for producing said first electrical signals comprises a pair of transducers movable together in said borehole and spaced a fixed distance one from the other, said means for producing said second electrical signals including a high-frequency pulse source, and means operable in response to the production of an output from one of said transducers for controlling the application of said pulses to said electrical conducting means, and said circuit means including circuit elements responsive to the production of an output from the other of said transducers for controlling the length of the segment of said pulses from said high-frequency source applied to said circuit means.

11. A system for measuring the time of travel of an acoustic pulse over an earth section penetrated by a borehole, comprising a high-frequency source for generating a timing function, means operable at a low repetition rate to produce a succession of acoustic pulses, a recorder, control means for said recorder to initiate and to terminate the recording of said timing function in timed relation with the appearance of each acoustic pulse at a pair of points spaced a predetermined distance apart in said borehole, means for varying the location of said points in said borehole along said section, and means for actuating said control means at each of a plurality of uniformly spaced-apart locations through said section whereby the time duration of the number of pulses recorded is directly proportional to the travel time of an acoustic pulse through said section.

References Cited in the file of this patent

UNITED STATES PATENTS

| | | |
|---|---|---|
| 2,191,119 | Schlumberger | Feb. 20, 1940 |
| 2,200,476 | Mounce | May 14, 1940 |
| 2,238,991 | Cloud | Apr. 22, 1941 |
| 2,275,736 | Cloud | Mar. 10, 1942 |
| 2,651,027 | Vogel | Sept. 1, 1953 |
| 2,665,411 | Frady | Jan. 5, 1954 |
| 2,704,364 | Summers | Mar. 15, 1955 |
| 2,708,485 | Vogel | May 17, 1955 |
| 2,768,701 | Summers | Oct. 30, 1956 |

UNITED STATES PATENT OFFICE
CERTIFICATE OF CORRECTION

Patent No. 2,949,973                                August 23, 1960

Robert A. Broding et al.

It is hereby certified that error appears in the printed specification of the above numbered patent requiring correction and that the said Letters Patent should read as corrected below.

Column 2, line 70, after "transducer" insert -- 11 --; column 3, line 7, for "incremental travel time", in italics, read -- Incremental Travel Time --, in italics; line 16, for "acoustic-" read -- acoustic --; line 39, for "On" read -- ON --; same column 3, line 51, for "Off" read -- OFF --; column 4, line 7, for "Total travel time", in italics, read -- Total Travel Time --, in italics; line 66, the word "accumulates" should appear in italics; column 7, line 20, after "station", second ccurrence, insert a comma; line 43, after "points" insert a comma.

Signed and sealed this 18th day of April 1961.

(SEAL)
Attest:

ERNEST W. SWIDER
Attesting Officer

DAVID L. LADD
Commissioner of Patents